United States Patent [19]

Petitclerc

[11] Patent Number: 5,610,596
[45] Date of Patent: Mar. 11, 1997

[54] SYSTEM FOR MONITORING AN INDUSTRIAL INSTALLATION

[75] Inventor: Jean-Louis Petitclerc, Tourlaville, France

[73] Assignee: Compagnie Generale des Matieres Nucleaires, Velizy-Villacoublay, France

[21] Appl. No.: 312,607

[22] Filed: Sep. 27, 1994

[30] Foreign Application Priority Data

Oct. 22, 1993 [FR] France .................................. 93 12627

[51] Int. Cl.$^6$ .................................................. G21C 17/00
[52] U.S. Cl. ................................ 340/825.23; 340/825.06; 340/306; 364/431.01; 235/383; 455/89
[58] Field of Search ........................ 340/825.06, 825.07, 340/825.31, 825.34, 825.35, 825.54, 306, 825.23, 870.02; 364/138, 148, 431.01; 235/375, 383; 455/89

[56] References Cited

U.S. PATENT DOCUMENTS

| | | | |
|---|---|---|---|
| 4,755,816 | 7/1988 | Deluca | 340/825.44 |
| 4,801,786 | 1/1989 | Stobbe | 235/377 |
| 4,827,394 | 5/1989 | Wanner | 364/138 |
| 4,969,206 | 11/1990 | Desrochers | 455/89 |
| 5,053,774 | 10/1991 | Schuermann et al. | 342/44 |
| 5,193,220 | 3/1993 | Ichinohe et al. | 455/89 |
| 5,212,809 | 5/1993 | Oka | 455/89 |
| 5,218,188 | 6/1993 | Hanson | 455/89 |
| 5,257,011 | 10/1993 | Beigel | 340/825.54 |
| 5,321,629 | 6/1994 | Shirata et al. | 340/825.54 |
| 5,322,991 | 6/1994 | Hanson | 455/90 |
| 5,339,339 | 8/1994 | Petitclerc et al. | 340/306 |

FOREIGN PATENT DOCUMENTS

| | | |
|---|---|---|
| 2655468 | 6/1991 | France . |
| 3150080 | 7/1983 | Germany . |
| 4041308 | 2/1992 | Japan . |
| 2102996 | 2/1983 | United Kingdom . |

Primary Examiner—Michael Horabik
Assistant Examiner—William H. Wilson, Jr.
Attorney, Agent, or Firm—Pearne, Gordon, McCoy & Granger

[57] ABSTRACT

A system for the surveillance or monitoring of an industrial installation (in particular a nuclear installation) making it possible for at least one operator to carry out rounds, the system having at least one central terminal (22) associated with a transmitter/receiver (23), identification labels located at different plotting or recording or acquisition points (12) at predetermined locations within the installation, and at least one portable terminal (26) available to each operator and associated with a data transmitter/receiver (27) for communicating with the central terminal and a label reader (28). These labels include electronic labels, whose content can be read and modified by writing. Electronic labels located on automatic equipment to be controlled, in each case contain a base for updated data relating to the characteristics of the equipment. The label reader associated with each portable terminal also permits a writing in the electronic labels.

6 Claims, 2 Drawing Sheets

SYSTEM FOR MONITORING AN INDUSTRIAL INSTALLATION

DESCRIPTION

1. Technical Field

The present invention relates to a system for monitoring an industrial installation and more particularly the systematic monitoring of nuclear installations.

2. Prior Art

The automatic operation of certain nuclear installations requires a regular monitoring or surveillance, which can be carried out by an operator performing a round in accordance with a predetermined route. During this round he records or plots the data supplied by sensors located at different points of the installation. He checks and if necessary modifies the operating state of equipment (e.g. opening or closing of a valve). At the end of the round, the results of the measurements performed can be stored and used for preventative and corrective maintenance purposes or for statistical processing. Access to different areas of installations can be difficult and even dangerous, so that it is necessary to ensure the safety of the operator.

A prior art French patent application 89 16059 of Dec. 5 1989 (U.S. Pat. No. 5,329,339) describes a process for performing a monitoring or surveillance round for a nuclear site authorizing preventative maintenance operations. A "dialogue" between a central monitoring unit and an operator makes it possible to follow the route of the latter between individual measuring points and thus ensure a satisfactory performance of a round. It also makes it possible to indicate in real time any abnormal condition noted during a measurement and to take the necessary steps without waiting for the operator to return. The operator may decide to perform complementary measurements or equipment operating changes not originally provided when the route for the round was defined. In this procedure the operator is assisted in his decisions by a portable microprocessor connected by a radio link to the central unit. If an abnormal condition is detected he may decide to suspend his round in order to carry out the operations which he considers necessary, whilst keeping the central monitoring unit informed.

The object of the invention is to simplify and improve the system described in said prior art application.

DESCRIPTION OF THE INVENTION

For this purpose, the invention proposes a system for monitoring an industrial installation making it possible for at least one operator to perform rounds, said system incorporating at least one central terminal associated with a transmission-reception means, identification labels located at different plotting or recording points at predetermined locations within the installation, and at least one portable terminal available to the operator associated with a data transmission-reception means for communicating with the central terminal and a means for reading the labels, wherein said labels comprise electronic labels, whose content can be read and modified by writing, wherein the electronic labels located on automatic equipment to be controlled, in each case contain a base for updated data concerning the characteristics of said equipment and wherein the reading means associated with each portable terminal also permits writing in said electronic labels.

Advantageously an electronic label comprises a capsule containing a battery and a chip installed on a printed microcircuit connected to the two poles of the battery. This capsule communicates with the exterior by two contacts, namely by a bidirectional transmission line for the information, contact taking place on the upper surface of the capsule, and by a reference line, the contact taking place by the periphery or bottom of the capsule. A pellet comprises a protected non-volatile memory and a ROM.

Using such electronic labels, the invention makes it possible to very significantly simplify and improve the process described in the aforementioned patent application. Thus, the electronic labels located on the equipment to be controlled can each have a data base necessary for the control of the corresponding equipment, more particularly containing its characteristics, the thresholds to be respected, the date and time of the final controls and checks made. Different teams (security guards, maintenance, etc.) can intervene on said equipment. These labels, which permit both reading and writing of data, are able to transmit information from one team to another without making it necessary for the operators to interrogate a central memory. Thus, they keep a decentralized information updated. Therefore an initialization route for the electronic labels of each equipment is necessary during the starting up of the system according to the invention.

The use of electronic labels installed at recording or plotting points makes it possible to prevent any falsification, e.g. any photocopying of labels when in the form of bar codes.

With such electronic labels, an operator can add new points in his round, so that a label installed on an equipment can, under certain operating conditions, incite the operator to check another equipment.

Advantageously the portable terminal is located in a case or package having small dimensions and has a microcomputer, a high power transmitter-receiver and a modem coupled to an electronic label reader.

Advantageously the portable terminal makes it possible to control both the data transmission and the radiophony communication with the central terminal and possible other portable terminals. It has a considerable autonomy as a result of the control of the consumption of the different elements by the microcomputer. Thus, the software in the microcomputer interrupts the power supply for the modem and transmitter-receiver if the latter is not in use. Moreover, the microprocessor, transmitter-receiver and modem have a supply control device reducing to a minimum the consumption during waiting times.

The system according to the invention has numerous original characteristics:

- the recording points can be equipped with electronic labels;
- the equipment to be controlled or checked can be equipped with electronic labels;
- the portable terminal is equipped with an electronic label reader, which also supplies information to the label "write" function on the label;
- the portable terminal software defines (for the round application) the information to be read/acquired on the equipments to be checked. These information are acquired on the portable terminal and transferred to the label attached to the equipment in question (writing function). The information are then simultaneously present on the label and in the portable terminal memory. The portable terminal content is obviously transferred at the end of the round to the central terminal for information processing purposes.

Such a system has numerous advantages:

the information relative to the equipment are decentralized to the latter;

with the electronic label attached to each equipment, it is possible to check during the round any random equipment equipped therewith, even if it is not covered by the particular round;

the order of the round is completely flexible;

the information are directly stored on the label attached to a particular equipment and in order to have information on the equipments there is no need to return to the control room because everything is on the label;

a rapid expert report is possible by reading the label information;

for maintenance purposes (different from the security guard application), it is possible to directly access informations concerning an equipment equipped with a label and it is possible to take readings without transferring the round to the portable terminals;

the label reader has small overall dimensions compared with a laser gun for reading labels of the "bar code" type;

improved safety and security:

the risks of deterioration are less than for bar code type labels, a bar code-type label can be edited several times, which implies an error risk, whereas with an electronic label there is no risk with respect to the identification of the equipment (equipment identified with certainty and in individual manner), as a bar code-type label is on a paper support, reading can deteriorate with time, whereas an electronic label has a much longer service life (several years).

DETAILED DESCRIPTION OF EMBODIMENTS

Figure 1:
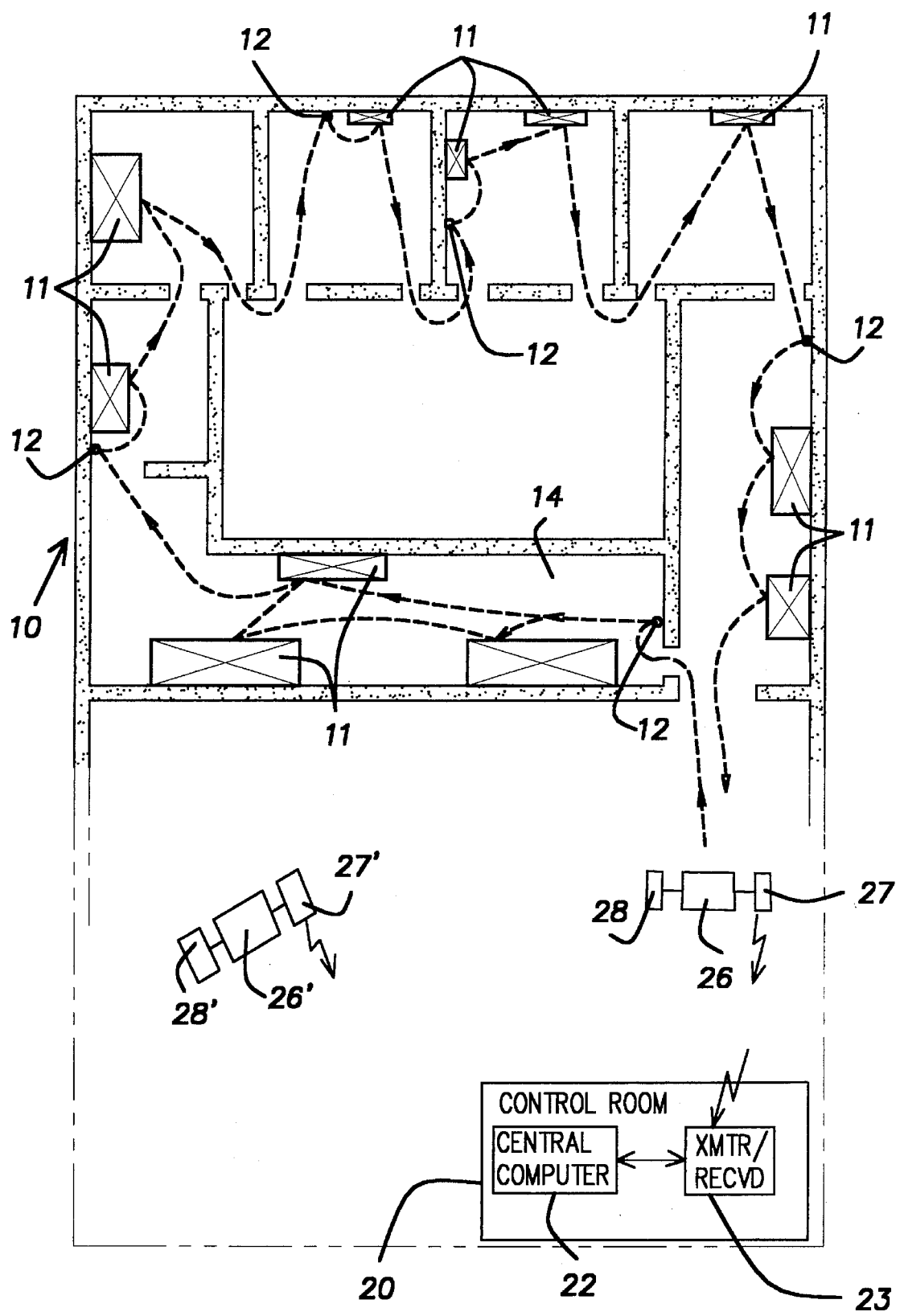
FIG. 1 diagrammatically shows the monitoring system according to the invention.
Figure 2:
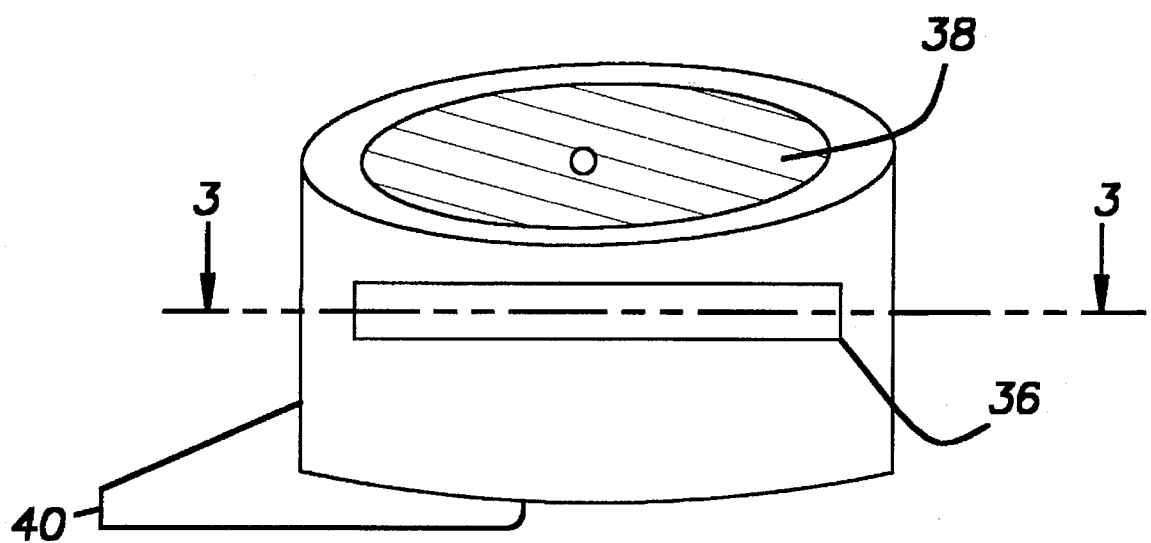
FIG. 2 shows an electronic label according to the invention.
Figure 3:
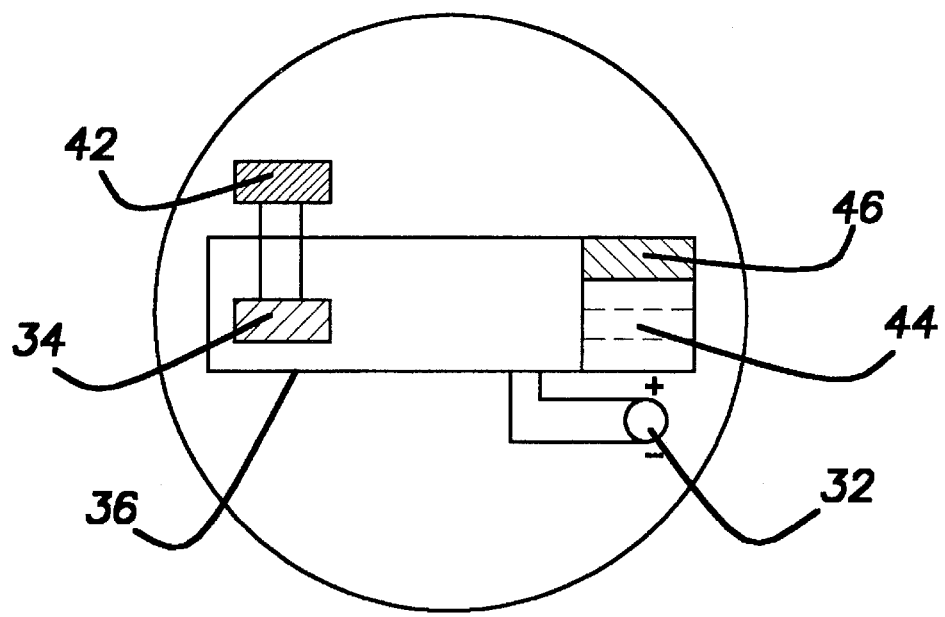
FIG. 3 shows a schematic section of the label taken from line 3—3 of FIG. 2.

As shown in the drawing, an industrial installation 10 has automatic equipment, (not shown) whose operation is controlled and checked by sensors distributed throughout the installation, but grouped around plotting or recording points 12. Equipment 11 having a certain functional state are also linked to these plotting points and said equipment can be valves, switches, etc. Each plotting point is located on the installation and marked by a label containing a code identifying the point.

In the drawing the installation is subdivided into several different rooms. It also has at least one control room 20 containing at least one central computer 22 connected to a radio transmitter-receiver 23.

Various data are contained in a general file kept updated after each round. This file recorded in the central computer 22 contains all the plotting or recording points 12 to which are allocated identification references permitting their location. The file also contains the list of sensors and equipment grouped around the recording points 12. These sensors and equipment 11 are given identification references. Various information complete this list in the file e.g. the sensor type (thermal, electric, irradiation-sensitive, smoke-sensitive) or equipment (valve, switch, elevator), the geographical location, the normally expected values or characteristics, tolerance thresholds, checks to be made on the data collected during rounds, the values recorded during various rounds already carried out, the date and time of these recorded values, the measurement units used and any information making it possible to perform an effective monitoring, such as e.g. assistance comments concerning each of the sensors and equipment. This file inter alia permits the display on a video monitor of a plan of the installation with all the recording points, sensors and equipment to be monitored.

Before starting on his round, the operator chooses from within the central file a linkage or concatenation of recording points 12, sensors and equipment 11 to be controlled and/or whose operating state is to be modified. This linkage is recorded in the central computer 22 and defines the route of the round within the installation. Recording also takes place of information concerning the recording or plotting points 12, the sensors and equipment 11 to be monitored. Standard routes are also available and avoid the necessity for the operator to define his complete route again when starting out. These standard routes can be modified at random.

When the linkage has been established, a theoretical time necessary for the passage between each plotting point is defined and recorded in a memory of the central computer 22 for each passage between two plotting points.

Each round starts from the control room 20, where the operator copies out the established linkage, as well as the associated information in a memory of a portable microcomputer terminal 26 provided with a screen and associated with a radio transmitter/receiver 27. This microcomputer terminal 26 is also provided with an electronic label reading-writing device 28. The terminal 26, which is carried on the round, guides the operator by indicating to him the plotting point 12 which he must visit and the sensors or equipment to be checked. Thus, the operator with his portable terminal can carry out rounds passing between the individual plotting or recording points.

On passing to each recording point 12, the operator reads the label carrying the identification reference of the point using the reading-writing device 28.

This reading constitutes a validation of the passage of the operator to the plotting point 12. The terminal 26 records the reading and allocates to it a passage timetable or schedule as a result of an internal clock. It displays on the screen a message confirming to the operator that the plotting or recording point is indeed that provided in the linkage constituting the round. In the opposite case, the display on the screen of the portable terminal indicates the displayed recording point and the need to perform again in situ an identification reading by reading the label.

For each reading of an identification reference of a plotting point, a location signal is transmitted by the transmitter 27 connected to the portable terminal 26 to the receiver 23 connected to the central computer 22. The reception of the signal has the effect of triggering a clock within the computer 22. If the following validation has not taken place when the previously defined theoretical time between two validations has elapsed, an alarm is triggered by the central computer 22. This alarm can initially be a signal transmitted by the transmitter 24 associated with the central computer 22 to the receiver 27 associated with the portable terminal 26. This signal initiates a sound and/or visual emission or the display of a message on the screen of the terminal 26. The operator must then reply by a message which he enters in the terminal 26 and which is radio transmitted to the computer 22. If no reply is received, the computer 22 can alert an emergency team, which will intervene more rapidly if the location of the operator is known.

At each plotting-or recording point 12, the operator plots or records information supplied by the sensors and enters them in a memory of the portable terminal 26. He also carries out checks and/or operating changes to the equipment 11 and records information relating to these equipment.

For each sensor or equipment 11, the terminal 26 carries out a comparison between these information and the values corresponding to a normal operation of the installations. This comparison, as well as the definition of the tolerance thresholds makes it possible to detect an operating abnormality.

Following each acquisition of information concerning the sensors or equipment 11, the operator must carry out a validation. When the validated value is not in accordance with standards, the terminal 26, by means of the transmitter 28, transmits a message to the central computer 22. As a function of the defective sensor and the abnormal condition type, said central computer alerts a maintenance team, which can operate rapidly and efficiently. Optionally, the central computer 22 can automatically interrupt certain electric or other circuits.

When an abnormal operation is noted, the operator can display historical information concerning measurements performed during earlier rounds. The portable terminal 26 also displays assistance comments with respect to the decision and the operator, as a function of the particular case, can change the order of passage to the recording points 12, check sensors or equipment 11 not stipulated when his round was defined, or interrupt his round, whilst keeping the central computer 22 informed by means of the radio link.

For each controlled or checked sensor or equipment 11, the operator is able to record comments on the operation of the installations. These comments help preventative maintenance in an effective manner, because they forecast incidents. For example, a maintenance team alerted by such comments can replace a particular part before it suffers deterioration and as soon as it shows any signs of malfunction.

At the end of the round, the information read on the sensors and contained in a memory of the portable terminal 26 are recorded in a memory of the central computer 22 so as to be processable there and in this way the central file is updated. The processing can be of a statistical nature on a large number of rounds, evolutions of information supplied by the sensors or a variation analysis with respect to information plotted on the sensors. If desired, a paper publication of all the information can be obtained.

The process according to the invention makes it possible to follow several operators from the same control room. The permanent link between the central computer and the portable terminal makes it possible to take fast and effective decisions.

As a result of this link and information contained in the portable terminal, the operator can analyse abnormal situations and act as a consequence thereof. He is responsible for his acts, but remains under the control of the central computer.

Advantageously the labels are electronic labels, which can be located at the recording points, but also on equipment whose measurements are to be checked.

These electronic labels installed on the equipment to be checked can in each case contain the results of most recent checks, possible operating instructions, the characteristics of the equipment, the thresholds to be respected, the date and time of the last checks carried out, etc. Different teams (security guards, maintenance, etc.) can thus intervene on said equipment. These equipment, permitting both the writing and reading of data, are able to transmit information from one team to another without it being necessary for the operators to interrogate the central memory. Therefore they make it possible to keep a decentralized information updated. An initialization route or navigation of the electronic labels of each equipment is necessary when the system according to the invention is started up.

With such electronic labels an operator can add new points to his round. It is possible to record unplanned equipment in a round, e.g. in room 14, because an electronic label contains the necessary elements making it possible to describe possible supplementary checks to be carried out on other equipment.

An electronic label has a life of several years and is not interchangeable, because it must be installed with the data of the equipment, which guarantees a security greater than that with a bar code.

The equipment controlled by the electronic labels have no need to be discharged at the outset on the portable terminal, because the electronic label contains the elements necessary for checking the equipment.

Bar code-type labels and electronic labels can coexist. Thus, it is possible to use electronic labels for certain equipment which it is more particularly wished to monitor, whilst leaving the bar codes for the remainder of the round. In this case, the portable terminal is also equipped with a bar code reader.

During his round, the operator can at any time request passage into the radiophony mode and then return to the transmission mode with respect to the data. Therefore the system according to the invention is able to control both data and radiophony. This system makes it possible to reduce risks of error in the marking of rooms and equipment during collection by the use of marks with labels. It also makes it possible to carry out statistical processing of readings and perform tendency and forecast calculations.

In a particular embodiment an electronic label is in the form of a circular, stainless steel capsule containing a battery 32 and a microcomputer chip 34 installed on a printed circuit 36 connected to the two poles of the battery. Each capsule communicates with the exterior by two contacts 38, 40, namely a bidirectional transmission line for the information (reading/writing) said contact 38 taking place by the upper surface of the capsule and a reference line (0 volt), contact 40 taking place by the periphery or bottom of the capsule.

The reliability of the transmission protocol used makes it possible to eliminate the reading error risk due to a possible contact break during the transaction. The two contacts are established by a very simple probe connected by an ordinary cable having two conductors to the control microprocessor chip 34.

The chip e.g. contains a protected, non-volatile memory 44 of e.g. 1152 bits, which can be read and written. This memory is subdivided into three areas of 384 bits each. Each area is protected by a 64 bit password authorizing the writing or reading of the memory. The label has a working area of 512 bits, whose content can be checked by reading and then transferred either by 8 byte blocks, or in totality (64 bytes) into one of the three main areas. Each capsule also has a Read Only Memory or ROM 46 programmed by laser at the time of manufacture. This ROM contains a single 48 bit number, plus an 8 bit family code and a Cyclic Redundancy Check (CRC) on 8 bits.

In an advantageous embodiment, the portable terminal used by the operator has the following different parts:

a miniature microcomputer of the PC type under MS DOS, a high power transmitter-receiver, a modem, said terminal being coupled to an electronic label reader, whilst being integrated into a small package or case.

The terminal according to the invention has several original features:

the integration of the assembly into a small package, the use of a high power transmitting-receiving circuit, the design of a new modem permitting a multi-mobile control, a radiophony/data passage control and vice versa, a control of the flows on four cables, an automatic awakening or alarm procedure at the initiative of the microcomputer or modem.

The portable terminal used for radio tracking must make it possible to permanently follow the movements of personnel in the installation, whilst permitting the transfer of information in real time between the control rooms and the security guards.

It makes it possible to control both data transmission and radiophony communication with the central terminal and with other portable terminals. It has a great autonomy due to the control of the consumption of the different components by the microcomputer. Thus, the software in the microcomputer interrupts the power supply for the modem and the transmitter-receiver if the latter is not used. Moreover, the microprocessor, transmitter-receiver and modem have a supply control device reducing consumption to a minimum during waiting.

Advantageously the portable terminal includes:

a CMS technology modem, a transmitter-receiver according to the standards of the different countries where the equipment has to be used.

It has in particular the following main functions:

data processing, transfer and collecting computer, radiophony communication: transmission/reception, radio data communication: transmission/reception.

The invention claimed is:

1. A system for monitoring an industrial installation making it possible for at least one operator to perform rounds, said system comprising at least one central terminal associated with a transmission-reception means, identification labels located at different plotting or recording points at predetermined locations within the installation, and at least one portable terminal available to the operator associated with a data transmission-reception means for communicating with the central terminal and a means for reading the labels, wherein said labels comprise electronic labels, whose content can be read and modified by writing, wherein the electronic labels located on automatic equipment to be controlled each contain a base for updated data concerning the characteristics of said equipment and wherein the reading means associated with each portable terminal also permits writing in said electronic labels, each of said electronic labels including a cylindrically-shaped stainless steel capsule having an upper surface, a lower surface, and a peripheral surface, each of said electronic labels also including a battery and a chip each contained within said capsule, said chip installed on a printed microcircuit connected to the two poles of said battery, wherein said electronic labels communicate with said portable terminal by a bidirectional transmission line for information having a first contact on said upper surface of said capsule and a second contact on at least one of said peripheral surface and said bottom surface of said capsule.

2. A system according to claim 1, wherein said electronic labels each further include a protected non-volatile memory and a ROM each contained within said capsule.

3. A system according to claim 1 comprising a portable terminal having a microcomputer, a high power transmitter-receiver and a modem coupled to an electronic label reader.

4. A system according to claim 3, wherein the portable terminal makes it possible to control both data transmission and radiophony communication with the central terminal and with other portable terminals.

5. A system according to claim 3, wherein the software in the microcomputer of the portable terminal interrupts the power supply for the modem and the transmitter-receiver when the latter is not in use and wherein the microcomputer, transmitter-receiver and modem have a power supply control device reducing consumption to a minimum when waiting.

6. A process for monitoring an industrial installation, comprising the following steps:

before starting on around, an operator chooses, from within a central file, a linkage or concatenation of recording points, sensors and equipment to be controlled and/or whose operating state is to be modified, this linkage being recorded in a central computer and defining a route of the round within the installation; each round starting from the central control room, where the operator copies out the established linkage, as well as associated information in a memory of a portable terminal provided with a screen and associated with a radio transmitter/receiver, and with an electronic label reading-writing device, the terminal, which is carried on the round, guiding the operator by indicating to him a plotting point that he must visit and the sensors or equipment to be checked;

when the linkage has been established, a theoretical time necessary for the passage between each plotting point is defined and recorded in a memory of the central computer to reach passage between two plotting points;

on passing to each recording point, the operator reads a label carrying an identification reference of the point using the reading-writing device, this reading includes validation of the passage of the operator to the plotting point, the terminal records the reading and allocates to it a passage timetable or schedule as a result of an internal clock, and the screen displays a message confirming or not confirming to the operator that the plotting or recording point is that point provided in the linkage for the round;

for each reading of an identification reference of a plotting point, a location signal is transmitted by the transmitter connected to the portable terminal to the receiver connected to the central computer, the reception of the signal having the effect of triggering a clock within the computer;

if a subsequent validation has not taken place when the previously defined theoretical time between two validations has elapsed, a signal is sent from the central computer to the portable terminal and an alarm is triggered by the central computer if the operator does not reply to said signal;

at each plotting or recording point, the operator plots or records information supplied by the sensors and enters them in a memory of the portable terminal, and also carries out checks and/or operating changes to the equipment and records information relating to this equipment;

for each sensor or equipment, the terminal carries out a comparison between this information and values corresponding to a normal operation of the installations, this comparison as well as definition of tolerance thresholds making it possible to detect an operating abnormality;

when the validated value is not in accordance with standards, the terminal, by means of the transmitter, transmits a message to the central computer;

when an abnormal operation is noted, the operator can display historical information concerning measurements performed during earlier rounds; the portable terminal also displays assistance comments with respect to the decision and the operator, as a function of the particular case, can change the order of passage to the recording points, check sensors or equipment not stipulated when his round was defined, or interrupt his round, whilst keeping the central computer informed by means of the radio link; and at the end of the round, the information read on the sensors and contained in a memory of the portable terminal are recorded in a memory of the central computer so as to be processable there and in this way the central file is updated.

* * * * *